US 8,457,286 B2

(12) United States Patent
Lesher et al.

(10) Patent No.: US 8,457,286 B2
(45) Date of Patent: Jun. 4, 2013

(54) SYSTEM, METHOD AND APPARATUS FOR ACKNOWLEDGING AN INCOMING PHONE CALL

(75) Inventors: Charles M. Lesher, Louisburg, KS (US); Jamie Christopher Howarter, Overland Park, KS (US); Heather Ann Hull, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 854 days.

(21) Appl. No.: 12/241,802

(22) Filed: Sep. 30, 2008

(65) Prior Publication Data
US 2010/0080363 A1  Apr. 1, 2010

(51) Int. Cl.
*H04M 1/64* (2006.01)
*H04M 3/42* (2006.01)

(52) U.S. Cl.
USPC .................... 379/88.23; 455/414.1

(58) Field of Classification Search
USPC .......... 379/88.23, 201.02, 201.12; 455/412.2, 455/413, 414.1
See application file for complete search history.

(56) References Cited

U.S. PATENT DOCUMENTS

| | | | |
|---|---|---|---|
| 6,456,842 B1 * | 9/2002 | Subramanian et al. | 455/414.3 |
| 7,010,288 B2 * | 3/2006 | Brown et al. | 455/412.1 |
| 7,370,278 B2 | 5/2008 | Malik et al. | |
| 7,370,289 B1 | 5/2008 | Ebert et al. | |
| 7,508,929 B2 | 3/2009 | D'Eqidio | |
| 7,613,287 B1 | 11/2009 | Stifelman et al. | |
| 2006/0167995 A1 | 7/2006 | Rui | |
| 2006/0234711 A1 | 10/2006 | McArdle | |
| 2007/0275698 A1 * | 11/2007 | Kuiken et al. | 455/414.1 |
| 2007/0288560 A1 | 12/2007 | Bou-Ghannam et al. | |
| 2008/0101584 A1 | 5/2008 | Thomas et al. | |
| 2008/0102783 A1 | 5/2008 | Bustamante | |
| 2008/0107258 A1 | 5/2008 | Fitzsimmons | |
| 2008/0165940 A1 | 7/2008 | Fiorillo et al. | |
| 2008/0295000 A1 | 11/2008 | Kieselbach et al. | |
| 2009/0030989 A1 | 1/2009 | Maresch et al. | |
| 2009/0238354 A1 * | 9/2009 | Mani | 379/201.02 |
| 2010/0087170 A1 * | 4/2010 | Ikeda et al. | 455/412.1 |
| 2010/0100387 A1 * | 4/2010 | Kuiken et al. | 704/270 |

OTHER PUBLICATIONS

Non-Final Rejection dated Dec. 7, 2009 in U.S. Appl. No. 12/116,044.
Response filed Jan. 22, 2010 to Non-Final Action dated Dec. 7, 2009 in U.S. Appl. No. 12/116,044.
Final Rejection date mailed Apr. 21, 2010 in U.S. Appl. No. 12/116,044.

(Continued)

*Primary Examiner* — Mohammad Islam
(74) *Attorney, Agent, or Firm* — Patton Boggs LLP

(57) ABSTRACT

An embodiment of a method, system, and apparatus for acknowledging an incoming call includes receiving an incoming call request addressed to a first communication device from a second communication device, and forwarding the incoming call request to the first communication device. The method further includes receiving an acknowledgment indication from the first communication device that the incoming call request has been received by a user of the first communication device. The method still further includes connecting a call between the second communication device and a media server in response to receiving the acknowledgment indication. In at least one embodiment, the media server is configured to play an acknowledgment voice message to the second communication device. A further embodiment includes sending a reminder message to the first communication device if the user of the first communication device has not initiated a return call to the second communication device within a predetermined time period.

15 Claims, 3 Drawing Sheets

OTHER PUBLICATIONS

U.S. Appl. No. 11/809,388; Non-Final Rejection dated Apr. 12, 2012; 33 pages.
U.S. Appl. No. 11/809,388; Request for Continued Examination and Amendment dated Nov. 9, 2011; 11 pages.
U.S. Appl. No. 11/809;388; Final Rejection dated Aug. 17, 2011; 27 pages.
U.S. Appl. No. 11/809,388; Non-Final Rejection dated May 13, 2011; 26 pages.
RCE filed Jun. 8, 2010 in U.S. Appl. No. 12/116,044.
Notice of Allowance date mailed Jun. 25, 2010 in U.S. Appl. No. 12/116,044.

* cited by examiner

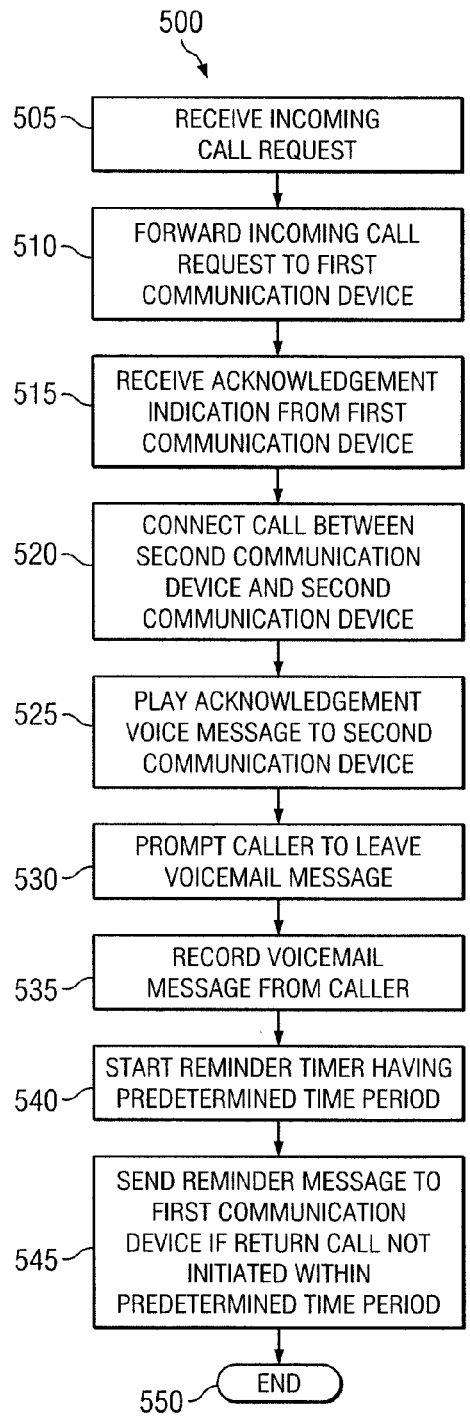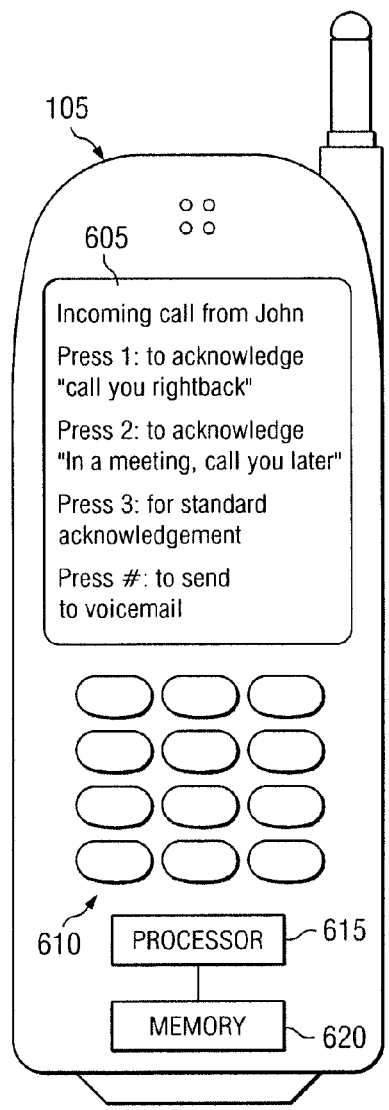
FIG. 5
FIG. 6

SYSTEM, METHOD AND APPARATUS FOR ACKNOWLEDGING AN INCOMING PHONE CALL

BACKGROUND

Sometimes a user of a communication device may receive an incoming call and recognize the caller associated with the incoming call, but may be unavailable to answer the incoming call or does not wish to answer the incoming call at the present time. For example, the user may be in a meeting at the time of the incoming call and unavailable to answer the incoming call without disturbing the meeting. Typically in such a situation, the user chooses to ignore the incoming call.

SUMMARY

An embodiment of a method for acknowledging an incoming call includes receiving an incoming call request addressed to a first communication device from a second communication device, and forwarding the incoming call request to the first communication device. The method further includes receiving an acknowledgment indication from the first communication device that the incoming call request has been received by a user of the first communication device. The method still further includes connecting a call between the second communication device and a media server in response to receiving the acknowledgment indication. In at least one embodiment, the media server is configured to play an acknowledgment voice message to the second communication device. A further embodiment includes sending a reminder message to the first communication device if the user of the first communication device has not initiated a return call to the second communication device within a predetermined time period.

An embodiment of a system for acknowledging an incoming call includes a media server and a switch. The switch is configured to receive an incoming call request addressed to a first communication device from a second communication device, and forward the incoming call request to the first communication device. The switch is further configured to receive an acknowledgment indication from the first communication device that the incoming call request has been received by a user of the first communication device, and initiate the delivery of an acknowledgment voice message to the second communication device.

An embodiment of a first communication device for acknowledging an incoming call includes a display, a user interface, a memory configured to store computer readable instructions, and a processor. The processor is configured to retrieve and execute the computer readable instructions operable to: receive an incoming call request from a second communication device; and generate an acknowledgment indication that a user of the first communication device has received the incoming call request and will not be answering the incoming call request.

BRIEF DESCRIPTION OF THE DRAWINGS

Illustrative embodiments of the present invention are described in detail below with reference to the attached drawing figures, which are incorporated by reference herein and wherein:

FIG. 5 is an embodiment of another procedure for acknowledging an incoming phone call by a user of a communication device; and FIG. 6 is an embodiment of the first communication device for acknowledging an incoming call.

DETAILED DESCRIPTION

Many times a user with a communication device, such as a wireless phone, does not want to interrupt a conversation or meeting to answer an incoming call. In addition, the user may be driving in traffic or taking a health break and may not wish to answer an incoming call or return a received text message at the present time. Various embodiments allow the user to acknowledge to the caller that the incoming call request has been received in order to let the caller know that the user is aware that the caller is trying to reach them, but cannot respond immediately to answer the phone or return the text message. Further embodiments provide for reminding the person that the caller has called after a pre-determined time period has elapsed. The person may then place a return call to the caller or take other appropriate action in response to the reminder. In some embodiments, the reminder message may operate as a "snooze" option such that a reminder message is continuously sent to the user at pre-determined time periods until the user initiates a return call to the user or cancels the reminder.

Figure 1:
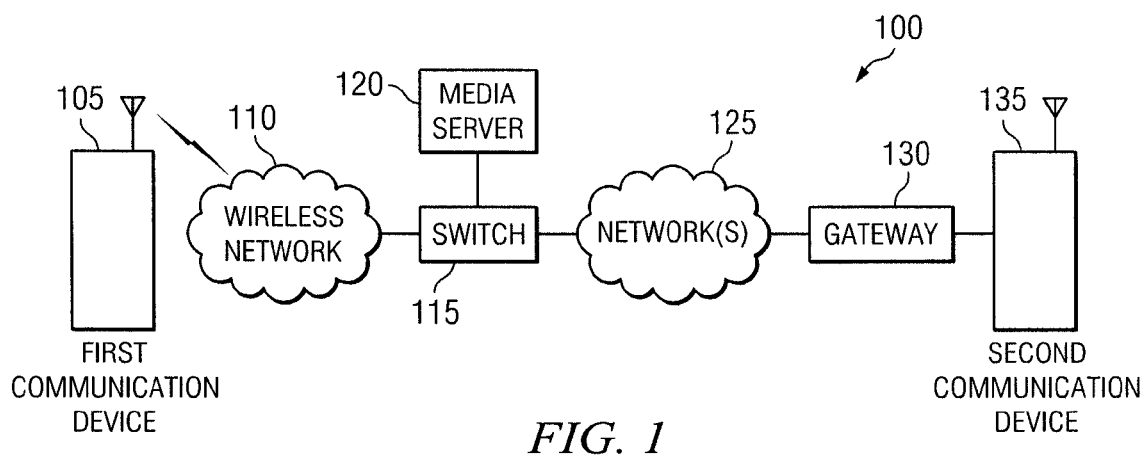
FIG. 1 is an embodiment of a system for acknowledging an incoming phone call.

FIG. 1 is an embodiment of a system 100 for acknowledging an incoming phone call. The system 100 includes a first communication device 105. In at least one embodiment, the first communication device 105 is a mobile telephone. In still other embodiments, the first communication device 105 may include a telephone, a personal digital assistant (PDA), or any other communication device. The first communication device 105 is configured to allow a user to receive an incoming call from a caller and establish a communication session with the caller. In still other embodiments, the first communication device 105 is configured to receive audio and/or text messages and allow the user to play back or review the messages. The first communication device 105 is in communication with a wireless network 110. In at least one embodiment, the wireless network 110 is a cellular network. In various embodiments, the first communication device 105 may be in communication with the wireless network 110 via a wireless base station. The wireless network 110 is in further communication with a switch 115. In an alternate embodiment, the first communication device 105 may be a wireless handset and may be in communication with the switch 115 via a wireless access point. In still other embodiments, the first communication device 105 may be a dual mode handset configured to be in communication with the switch 115 via either of a cellular connection or a Wi-Fi connection. In still another embodiments, the first communication device 105 may be located at a customer premise location or business location and may be in communication with the switch 115 via a wired connection.

In various embodiments the switch 115 is configured to receive one or more incoming calls, and route the incoming calls to one or mote communication devices to which the incoming calls are addressed, for example, the first communication device 105. The switch 115 is further configured to route messages, such as audio and text messages, between communication devices. In a particular embodiment, the switch 115 is a mobile switching center (MSC). The switch 115 is in further communication with a media server 120. In at least one embodiment, the media server 120 is configured to provide voicemail, messaging, and incoming call acknowledgment services to communication devices.

The switch 115 is in further communication with a network(s) 125. In various embodiments, the netwotk(s) 125 is one or more of a wireless network, a wired network, a packet switched network, an ATM network, a PSTN, or any other communication network. The network(s) 125 is in further communication with a gateway 130. In a particular embodiment, the gateway 130 is a local exchange carrier (LEC) gateway. The gateway 130 is in further communication with a second communication device 135. In various embodiments, the second communication device 135 may be one or more of a mobile communication device, a landline communication device, for example, a telephone, or any other communication device.

In at least one embodiment, a caller using the second communication device 135 may place an incoming call to the first communication device 105. The incoming call is received by the switch 115 and forwarded to the first communication device 105. If the user of the first communication device 105 is unable or does not wish to answer the incoming call, the user may acknowledge that the incoming call has been received using the first communication device 105. An acknowledgment indication is then generated by the first communication device 105 and sent from the first communication device 105 to the switch 115 in response to the acknowledgment by the user, and the switch 115 then forwards the acknowledgment indication to the media server 120. In a particular embodiment, the user of the first communication device 105 may acknowledge the incoming call by pressing a button on the first communication device 105. In response to receiving the acknowledgment indication, the media server 120 is configured to send an acknowledgment message to the second communication device 135. Upon receiving the acknowledgment message, the caller using the second communication device 135 is given an indication that the user of the first communication device 105 is aware they are calling, but cannot or does not wish to answer incoming calls at that time. In a particular embodiment, the acknowledgment message may include a pre-recorded audio message personalized to the caller of the second communication device 135. For example, the user of the first communication device 105 may record the following pre-recorded acknowledgment message: "John, I can't pick up the phone right now. I'll call you back later". In at least one embodiment, the pre-recorded audio message is associated with a caller identifier identifying the caller associated with the second communication device 135. In a particular embodiment, the caller identifier is caller ID information associated with the second communication device 135. In still other embodiments, the acknowledgment message may include a text message, such as an email or a short messaging service (SMS) message.

In various embodiments, the media server 120 may be further configured to send a reminder message to the first communication device 105 if the user of the first communication device 105 has not initiated a return call to the second communication device 135 within a predetermined time period after the user of the first communication device 105 has acknowledged the incoming call. In at least one embodiment, the predetermined time period is 10 minutes. In still other embodiments, the predetermined time-period may be configured by a user of the first communication device 105. In a particular embodiment, the user of the first communication device 105 logs into a portal, such as a web portal, to configure the predetermined time period. In still other embodiments, the user of the first communication device 105 may associate a different predetermined time period for each caller. In at least one embodiment, the reminder message may include a text message, such as an SMS message, an email, or an instant message. In still other embodiments, the reminder message may include an audio message. In still other embodiments, the media server 120 may be further configured to prompt the caller of the second communication device 135 to leave a voicemail message to the user of the first communication device 105 after the user of the first communication device 105 acknowledges the incoming call.

Figure 2:
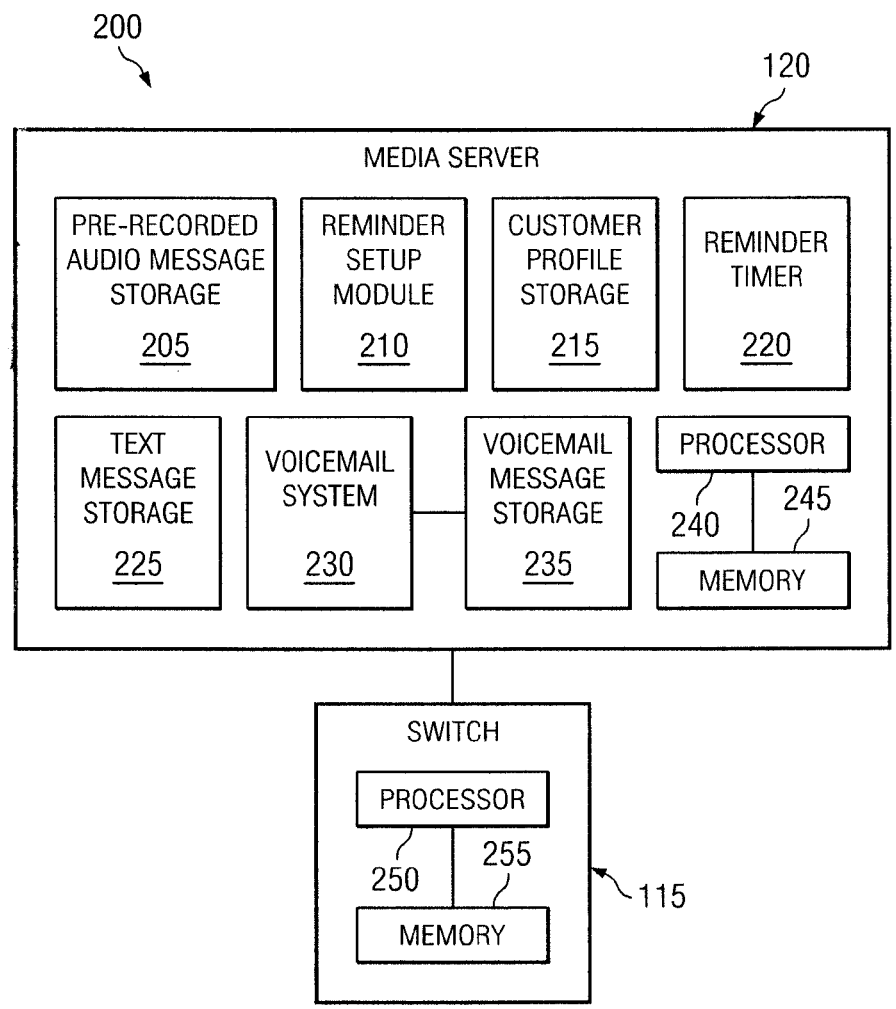
FIG. 2 is an embodiment of the switch and media server.

FIG. 2 is an embodiment 200 of the switch 115 and media server 120. The media server 120 includes a pre-recorded audio message storage 205. The pre-recorded audio message storage 205 is configured to store one or more audio messages recorded by one or more users of communication devices (for example, first communication device 105), and associate the recorded audio messages with one or mote caller identifiers identifying communication devices associated with one or more callers. In at least one embodiment, the caller identifier is caller ID information associated with a particular communication device. For example, the user of the first communication device 105 may record one or more audio messages personalized to a particular caller, such as the caller of the second communication device 135, and associate each of the pre-recorded audio messages with a caller identifier. The media server 120 further includes a reminder setup module 210. The reminder setup module is configured to allow a user to setup reminders for the user to return a call received from a particular caller. In particular embodiments, the reminder setup module 210 allows a user to configure a predetermined time period for each caller and/or the type of message that the user wishes to receive as a reminder message, such as a text message or an audio message. The media server 120 further includes a customer profile storage 215. The customer profile storage 215 is configured to store one or more customer profiles associated with one or more user communication devices, for example, the first communication device 105. In particular embodiments, the customer profile storage 215 may store a user identifier and a caller list associated with the user identifier. In at least one embodiment, the caller list includes one or more caller identifiers associated with incoming caller communication devices. The customer profile storage 215 may be further configured to store an association of the caller identifiers with the pre-recorded audio messages stored in the pre-recorded audio message storage 205, as well as reminder options associated with the customer profile. In still other embodiments, the customer profile storage 115 may be configured to store ringtones, ringers, or text messages associated with a particular customer profile.

In at least one embodiment, the media server 120 further includes a reminder timer 220. The reminder timer 220 is configured to start a timer upon a user's acknowledgment of an incoming call, and trigger the media server 120 to send a reminder message to the user when a predetermined time period has expired. The media server 120 further includes text message storage 225. The text message storage 225 is configured to allow a user or users to store one or more text messages for use as a acknowledgment messages. The text messages in the text message storage 225 are then associated with one or more caller identifiers by the user. The media server further includes a voicemail system 230 and a voice message storage 235. The voicemail system 230 is configured to prompt an incoming caller to leave a voice message for a user, record a voicemail message from the incoming caller, and store the voicemail message in the voicemail message storage 235. The voicemail system 230 is further configured to allow the user to retrieve and playback a voicemail message stored in the voicemail message storage 235 at a later time.

The media server 120 further includes a processor 240 and memory 245. The processor 240 is configured to retrieve and execute computer readable instructions from the memory 245 in order to perform the various functions of the media server 120 described herein. The switch 115 further includes a processor 250 and a memory 255. The process 250 is configured to retrieve and execute computer readable instructions stored in the memory 255 in order to perform the various functions of a switch 115 described herein.

Figure 3:
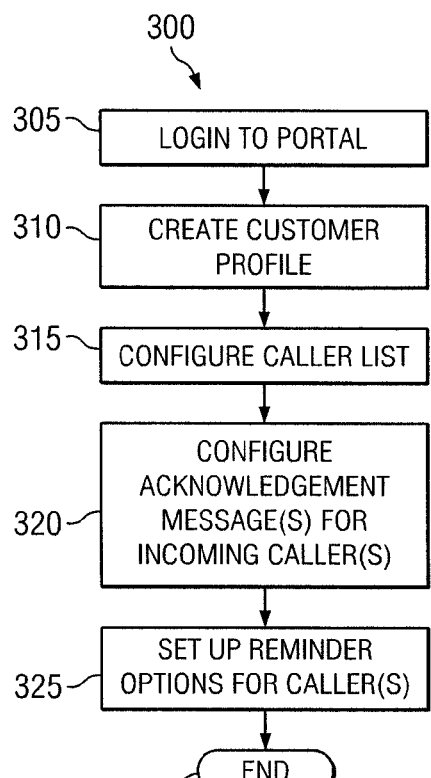
FIG. 3 is an embodiment of a procedure for setting up a customer profile for use in acknowledging incoming phone calls.

FIG. 3 is an embodiment of a procedure 300 for setting up a customer profile for use in acknowledging incoming phone calls. In step 305, the user of the first communication device 105 logs into a portal. In at least one embodiment of the invention, the portal is a web portal. In at least one embodiment, the user logs into the portal by entering a user ID and a password. In step 310, the user creates a customer profile. The customer profile stores information associated with the user of the first communication device 105 including a phone number associated with the first communication device 105, a caller list containing a list of caller identities associated with incoming callers and associations of the caller identifiers in the calling list with one or more acknowledgement messages stored in one or more of the pre-recorded audio message storage 205 and the text message storage 225. In step 315, the user of the first communication device 105 configures a caller list. The caller list includes one or more caller identifiers where each caller identifier is associated with a communication device associated with an incoming caller. In at least one embodiment, the caller identifier is a telephone number associated with a particular communication device. For example, the caller list may include a telephone number associated with the second communication device 135. In still other embodiments, the caller list may further include a caller name associated with a communication device associated with a communication device associated with one or more of the incoming callers. In at least one embodiment, the user configures the caller list by entering the caller identifier, such as a telephone number, associated with the particular communication device of an incoming caller. In still other embodiments, the user may select a particular caller identifier from a list of caller identifiers displayed to the user. In step 320, the user configures one or more acknowledgment messages and associates them with one or more of the caller identifiers in the caller list. In at least one embodiment, the acknowledgement message is a text message, such as an email, a text message, or an instant message. In such an embodiment, the user may enter a text message for one or more of the incoming callers and associate the text message with the caller identifier associated with the incoming caller. For example, the user may enter a text message with the following text "John, I will call you later" for a caller identifier associated with an incoming caller named, John. In still other embodiments, the user may select the acknowledgement message for a particular incoming caller from a list of standardized acknowledgment messages. In some embodiments, the acknowledgment message may be a pre-recorded audio message personalized to a particular caller. In such embodiments, the user may be prompted by the media server 120 to record an audio message for a particular incoming caller. For example, the user may record an audio message having the content, "John, I will call you back later" and associate the acknowledgment message with the caller identifier associated with an incoming caller, John. In still other embodiments, the user may select a standardized audio message and associate that standardized message with a particular caller identifier. In still other embodiments, the user may chose a default acknowledgment message, such as a default text or default audio message, that will be sent to incoming callers that either cannot be identified or that are not found in the user's caller list.

In step 325, the user may set up reminder options for incoming callers in the caller list. The reminder options include a reminder period for each incoming caller. The reminder period is a predetermined time period for which the user desires to be reminded if he has not returned a particular call from an incoming caller within the time period. In a particular embodiment, the user may enter a pre-determined time period for each caller using the portal. In still other embodiments, the user may select the pre-determined time period from a list of predetermined time periods displayed to the user. In still other embodiments, a pre-determined time period, for example ten minutes, may be set as a default period for every incoming caller unless the user chooses another pre-determined time period. The reminder options may further include a desired type of reminder message for each incoming caller. In at least one embodiment, the user may select the reminder message type to be one or more of a text message or an audio message. In various embodiments, the user may set a different pre-determined time period for the reminder message for each incoming caller. For example, the user may wish to set the pre-determined time period for sending a reminder message when the user's spouse calls to be equal to five minutes, while setting the pre-determined time period for a reminder message equal to 15 minutes when a friend calls. In step 330, the procedure 300 ends.

Figure 4:
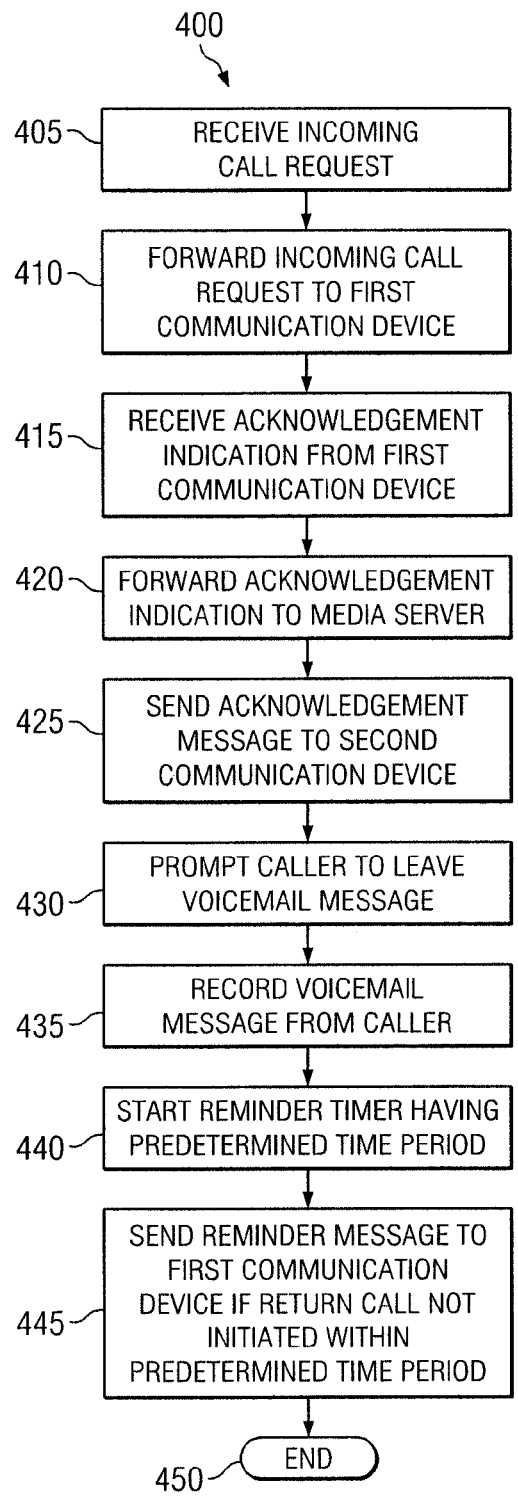
FIG. 4 is an embodiment of a procedure for acknowledging an incoming phone call by a user of a communication device.

FIG. 4 is an embodiment of a procedure 400 for acknowledging an incoming phone call by a user of a communication device. In step 405, an incoming call request from a caller using the second communication device 135 is received at the switch 115. The incoming call request is addressed to the first communication device 105. In a particular embodiment, the caller of the second communication device 135 addresses the incoming call request to the first communication device 105 by dialing a telephone number associated with the first communication device 105. In various embodiments, the incoming call request is a request to establish a voice call session between the second communication device 135 and the first communication device 105.

In step 410, the switch 115 forwards the incoming call request to the first communication device 105. The incoming call request is displayed to the user of the first communication device 105 along with the caller identifier, such as caller ID information, associated with the second communication device 135. The user is further presented with the option of providing a user input to acknowledging the incoming call request if the user does not wish to accept the incoming call request at that time. In a particular embodiment, the user is prompted to press a particular button on a user interface of the first communication device 105 if the user wishes to acknowledge the incoming call request. For example, the user may be prompted to press a "1" key of the first communication device 105 if the user wishes to acknowledge the incoming call request. In still other embodiments, the user may be presented with the option of acknowledging the incoming call request by selecting from a number of acknowledgment options displayed to the user by the first communication device 105. For example, the user may select an acknowledgment option indicating that the user will return the caller's call soon, or alternately select an acknowledgment option indicating that the user will be busy for the rest of the day and will return the call later. If the user acknowledges the incoming call request, the switch 115 receives an acknowledgment indication from the first communication device 105 in step 415. The acknowledgment indication identifies to the media server 120 that an acknowledgment message is to be sent to the incoming caller. In at least one embodiment, the acknowledgment indication identifies a particular acknowledgment message chosen from a plurality of acknowledgment messages that is to be sent to the incoming caller. In step 420, the switch 115 forwards the acknowledgement indication to the media server 120.

In step 425, the media server 120 sends an acknowledgment message associated with the incoming caller to the second communication device 135 in response to receiving the acknowledgment indication. The acknowledgment message provides an indication to the caller of the second communication device 135 that the incoming call request has been received by the user of the first communication device 105, but that the user of the first communication 105 is either unable or does not wish to speak to the caller at that time. In a particular embodiment, the acknowledgment message is a text message, such as an email, an SMS message, or an instant message. In still other embodiments, the acknowledgment message is a pre-recorded audio message personalized to the incoming caller. In still other embodiments, more than one acknowledgment message may be sent to the incoming caller. For example, a text message may be sent to the caller's cell phone, an email message may be sent to an email account associated with the caller, and a pre-recorded audio message may be sent to a voicemail account associated with the caller. In step 430, the media server 120 prompts the caller to leave a voicemail message for the user of the first communication device 105. In step 435, the media server 120 records the voicemail message from the caller. In an alternative embodiment, steps 430 and 435 may be omitted from the procedure 400. In still other embodiments, steps 430 and 435 may be performed if the user does not acknowledge the incoming call request.

In step 440, the media server 120 starts a reminder timer having a predetermined time period associated with the incoming caller. The predetermined time period is a reminder period for which the user of the first communication device 105 wishes to be reminded to return the incoming call request if the user of the first communication device 105 has not initiated a return call to the second communication device within the predetermined time period. In some embodiments, the reminder timer may start counting from the time that the incoming call request is received. In still other embodiments, the reminder timer may start counting from the time that the incoming call request is acknowledged by the user.

In step 445, the media server 120 sends a reminder message to the first communication device 105 if the user of the first communication device 105 has not initiated a return call to the second communication device 135 within the predetermined time period. In at least one embodiment, the reminder message may be a text message sent to the first communication device 105 indicating that the user has not called back the particular caller. In still other embodiments, the reminder message may be an audio message sent to the first communication device 105. In an example embodiment, the media server 120 may cause the switch 115 to ring back the first communication device 105 and play the reminder message in audio form to the user of the first communication device 105 when the user of the first communication device 105 answers the ring back call. In some embodiments, the reminder message may be repeatedly sent to the first communication device 105 at intervals of the pre-determined time period until the user initiates a return call or the reminder message has been sent a pre-determined number of times. In still other embodiments, the user may cancel the reminder message without having returned the call. In still other embodiments, the user may choose to send the reminder message to another communication device or messaging account associated with the user. For example, the user may choose to send the reminder message to an e-mail address associated with the user. In step 450, the procedure 400 ends.

FIG. 5 is an embodiment of a procedure 500 for acknowledging an incoming phone call by a user of a communication device. In step 505, an incoming call request from a caller using the second communication device 135 is received at the switch 115. The incoming call request is addressed to the first communication device 105. In a particular embodiment, the caller of the second communication device 135 addresses the incoming call request to the first communication device 105 by dialing a telephone number associated with the first communication device 105. In various embodiments, the incoming call request is a request to establish a voice call session between the second communication device 135 and the first communication device 105.

In step 510, the switch 115 forwards the incoming call request to the first communication device 105. The incoming call request is displayed to the user of the first communication device 105 along with the caller identifier, such as caller ID information, associated with the second communication device 135. The user is further presented with the option of providing a user input to acknowledging the incoming call request if the user does not wish to accept the incoming call request at that time. In a particular embodiment, the user is prompted to press a particular button on a user interface of the first communication device 105 if the user wishes to acknowledge the incoming call request. For example, the user may be prompted to press a "1" key of the first communication device 105 if the user wishes to acknowledge the incoming call request. In still other embodiments, the user may be presented with the option of acknowledging the incoming call request by selecting from a number of acknowledgment options displayed to the user by the first communication device 105. For example, the user may select an acknowledgment option indicating that the user will return the caller's call soon, or alternately select an acknowledgment option indicating that the user will be busy for the rest of the day and will return the call later. If the user acknowledges the incoming call request, the switch 115 receives an acknowledgment indication from the first communication device 105 in step 515. In a particular embodiment, the acknowledgment indication indicates to the media server 120 that an acknowledgment voice message is to be played to the incoming caller. In at least one embodiment, the acknowledgment indication identifies a particular acknowledgment voice message chosen from a plurality of acknowledgment voice messages that is to be sent to the incoming caller. In step 520, the switch 115 connects the call between the second communication device 135 and the media server 120 in response to receiving the acknowledgment indication.

In step 525, the media server 120 plays an acknowledgment voice message associated with the incoming caller to the second communication device 135. The acknowledgment voice message provides an indication to the caller of the second communication device 135 that the incoming call request has been received by the user of the first communication device 105, but that the user of the first communication 105 is either unable or does not wish to speak to the caller at that time. In a particular embodiment, the acknowledgment voice message is a pre-recorded audio message personalized to the incoming caller. In step 530, the media server 120 may optionally prompt the caller to leave a voicemail message for the user of the first communication device 105. In step 535, the media server 120 may optionally record the voicemail message from the caller. In an alternative embodiment, steps 530 and 535 may be omitted from the procedure 400. In still other embodiments, steps 530 and 535 may be performed if the user does not acknowledge the incoming call request.

In step 540, the media server 120 starts a reminder timer having a predetermined time period associated with the incoming caller. The predetermined time period is a reminder period for which the user of the first communication device 105 wishes to be reminded to return the incoming call request if the user of the first communication device 105 has not initiated a return call to the second communication device within the predetermined time period. In some embodiments, the reminder timer may start counting from the time that the incoming call request is received. In still other embodiments, the reminder timer may start counting from the time that the incoming call request is acknowledged by the user.

In step 545, the media server 120 sends a reminder message to the first communication device 105 if the user of the first communication device 105 has not initiated a return call to the second communication device 135 within the predetermined time period. In at least one embodiment, the reminder message may be a text message sent to the first communication device 105 indicating that the user has not called back the particular caller. In still other embodiments, the reminder message may be an audio message sent to the first communication device 105. In an example embodiment, the media server 120 may cause the switch 115 to ring back the first communication device 105 and play the reminder message in audio form to the user of the first communication device 105 when the user of the first communication device 105 answers the ring back call. In some embodiments, the reminder message may be repeatedly sent to the first communication device 105 at intervals of the pre-determined time period until the user initiates a return call or the reminder message has been sent a pre-determined number of times. In still other embodiments, the user may cancel the reminder message without having returned the call. In still other embodiments, the user may choose to send the reminder message to another communication device or messaging account associated with the user. For example, the user may choose to send the reminder message to an e-mail address associated with the user. In step 550, the procedure 500 ends.

FIG. 6 is an embodiment of the first communication device 105 for acknowledging an incoming call. The first communication device 105 includes a display 605 and a user interface 610. In at least one embodiment, the user interface 610 is a keypad. In at least one embodiment, the display 605 is configured to display one or more incoming call requests to the user of the first communication device 105. In the embodiment illustrated in FIG. 6, the display 605 is currently displaying an incoming call request from a caller named John. The display 605 further displays a number of options to acknowledge the incoming call request. In the embodiment illustrated in FIG. 6, the user may press a "1" key of the user interface 610 to send an acknowledgment message to the incoming caller that reads "Call you tight back", press a "2" key of the user interface 610 to send an acknowledgment message to the incoming caller of "In a meeting, call you later", press a "3" key of the user interface 610 to send a standard acknowledgment message to the incoming call, or press "#" key of the user interface 610 to send the incoming call request directly to voicemail without sending an acknowledgment message.

In still other embodiments, the first communication device 105 may include a touch screen graphical user interface allowing a user to press a predetermined area of display 605 to acknowledge the incoming call request and/or choose a particular acknowledgment message. The first communication device 105 further includes a processor 615 and memory 620. The processor 615 is configured to retrieve and execute computer readable instructions from the memory 620 in order to perform the various functions of the first communication device 105 described herein.

The illustrative embodiments can take the form of an entirely hardware embodiment, an entirely software embodiment, or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The computer-usable or computer-readable medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer-readable program code, such that when the computer-readable program code is executed on a computer, the execution of this computer-readable program code causes the computer to transmit another computer-readable program code over a communication link. This communication link may use a medium that is, for example, without limitation, physical, or wireless.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for acknowledging an incoming call comprising:
  receiving an incoming call request addressed to a first communication device from a second communication device utilized by a caller;
  forwarding the incoming call request to the first communication device utilized by a user;
  receiving an acknowledgment indication from the first communication device that the incoming call request has been received by the user of the first communication device; and
  connecting a call between the second communication device and a media server in response to receiving the acknowledgment indication from the first communication device utilized by the user, wherein the media server is configured to send at least one acknowledgment message which is not a voice message to the second communication device utilized by the caller, wherein the acknowledgement message is associated with the acknowledgement indication, and wherein the acknowledgement indication is selectable by the user from a plurality of acknowledgement indications including at least default indications and user entered text indications;

wherein the media server is further configured to prompt the caller associated with the second communication device to leave a voicemail message after playing the acknowledgement message; and wherein the media server is further configured to record a voicemail message from the caller.

2. The method of claim 1, further comprising:
sending a reminder message to the first communication device if the user of the first communication device has not initiated a return call to the second communication device within a predetermined time period.

3. The method of claim 2, further comprising:
setting the predetermined time period and repetition of the predetermined time period in response to a selection by the user of the first communication device.

4. The method of claim 1, further comprising:
generating the acknowledgment message by the user; and
associating the acknowledgment message with a caller identifier, wherein the caller identifier is associated with the second communication device.

5. The method of claim 1, further comprising:
prompting the user of the first communication device to acknowledge the incoming call request;
receiving an input from the user of the first communication device; and
sending the acknowledgment indication in response to receiving the user input.

6. The method of claim 1 wherein the media server is configured to send a plurality of acknowledgement messages to the second communications device, and wherein the plurality of acknowledgement messages are of differing message formats.

7. The method of claim 6 wherein at least one of the plurality of acknowledgement messages is sent in an audio message format.

8. A system for acknowledging an incoming call comprising:
a media server; and
a switch, the switch configured to:
receive an incoming call request addressed to a first communication device from a second communication device utilized by a caller;
forward the incoming call request to the first communication device utilized by a user;
receive an acknowledgment indication from the first communication device that the incoming call request has been received by the user of the first communication device; and
connect a call between the second communication device and a media server in response to receiving the acknowledgment indication from the first communication device utilized by the user, wherein the media server is configured to send an acknowledgment message which is not a voice message to the second communication device utilized by the caller, wherein the acknowledgement message is associated with the acknowledgement indication, and wherein the acknowledgement indication is selectable by the user from a plurality of acknowledgement indications including at least default indications and user entered text indications;

wherein the media server is further configured to prompt the caller associated with the second communication device to leave a voicemail message after sending the acknowledgement message; and wherein the media server is further configured to record a voicemail message from the caller.

9. The system of claim 8, wherein the media server is configured to:
send a reminder message to the first communication device if the user of the first communication device has not initiated a return call to the second communication device within a predetermined time period.

10. The system of claim 9, wherein the predetermined time period and repetition of the predetermined time period in is set by the user of the first communication device.

11. The system of claim 8, wherein the acknowledgement message comprises a text message.

12. The system of claim 10, wherein the acknowledgment voice message is generated by the user and associated with a caller identifier utilizing a user interface, and wherein the caller identifier is associated with the second communication device.

13. The system of claim 10, wherein the acknowledgment indication is received in response to a user selection from a menu of the plurality of acknowledgement indications.

14. The system of claim 8 wherein the media server is configured to send a plurality of acknowledgement messages to the second communications device, and wherein the plurality of acknowledgement messages are of differing message formats.

15. The system of claim 8 wherein at least one of the plurality of acknowledgement messages is sent in an audio message format.

* * * * *